(12) United States Patent
Kuno et al.

(10) Patent No.: US 12,453,478 B2
(45) Date of Patent: Oct. 28, 2025

(54) COVER STRUCTURE, DETECTION DEVICE, AND METHOD FOR MANUFACTURING DETECTION DEVICE

(71) Applicant: CASIO COMPUTER CO., LTD., Tokyo (JP)

(72) Inventors: Toshiya Kuno, Hamura (JP); Masaru Sato, Kodaira (JP)

(73) Assignee: CASIO COMPUTER CO., LTD., Tokyo (JP)

(*) Notice: Subject to any disclaimer, the term of this patent is extended or adjusted under 35 U.S.C. 154(b) by 1174 days.

(21) Appl. No.: 17/022,285

(22) Filed: Sep. 16, 2020

(65) Prior Publication Data
US 2021/0085188 A1    Mar. 25, 2021

(30) Foreign Application Priority Data

Sep. 20, 2019 (JP) ................................ 2019-172167
Sep. 24, 2019 (JP) ................................ 2019-172667

(51) Int. Cl.
| | |
|---|---|
| A61B 5/00 | (2006.01) |
| A61B 5/01 | (2006.01) |
| G01J 5/00 | (2022.01) |
| G01J 5/04 | (2006.01) |
| G01J 5/0875 | (2022.01) |

(52) U.S. Cl.
CPC .............. *A61B 5/01* (2013.01); *A61B 5/6847* (2013.01); *G01J 5/0011* (2013.01); *G01J 5/041* (2013.01); *G01J 5/0875* (2013.01); *A61B 2562/0271* (2013.01); *A61B 2562/12* (2013.01)

(58) Field of Classification Search
CPC .................................................. A61B 5/01
See application file for complete search history.

(56) References Cited

U.S. PATENT DOCUMENTS

| | | |
|---|---|---|
| 5,645,350 A | 7/1997 | Jang |
| 6,149,297 A | 11/2000 | Beerwerth et al. |
| 8,126,672 B2 * | 2/2012 | Yamaguchi ............. G01J 5/049 |
| | | 600/203 |

(Continued)

FOREIGN PATENT DOCUMENTS

| | | |
|---|---|---|
| CN | 1202243 A | 12/1998 |
| CN | 201031399 Y | 3/2008 |

(Continued)

OTHER PUBLICATIONS

Notice of Reasons for Refusal dated Sep. 14, 2021 received in Japanese Patent Application No. JP 2019-172167 together with an English language translation.

(Continued)

*Primary Examiner* — Joseph M Santos Rodriguez
(74) *Attorney, Agent, or Firm* — Scully, Scott, Murphy & Presser, P.C.

(57) ABSTRACT

A detection device of the present invention includes a temperature sensor configured to detect a temperature of an eardrum of a human, a supporting member including a columnar portion, to a distal end of which the temperature sensor is attached, a cover that covers the temperature sensor, and a heat shrinkable tube that adheres tightly to a peripheral wall of the cover and a side surface of the columnar portion in a state in which the heat shrinkable tube is shrunk after being heated.

13 Claims, 9 Drawing Sheets

(56) References Cited

U.S. PATENT DOCUMENTS

| | | | |
|---|---|---|---|
| 8,568,023 B2 * | 10/2013 | Tanaka | G01J 5/08 374/170 |
| 2002/0176478 A1 | 11/2002 | Tabata | |
| 2004/0240516 A1 | 12/2004 | Harr | |
| 2006/0239329 A1 | 10/2006 | Tanaka | |
| 2007/0127545 A1 * | 6/2007 | Lee | G01J 5/049 374/208 |
| 2010/0005881 A1 | 1/2010 | Broedel et al. | |
| 2010/0183044 A1 | 7/2010 | Tanaka | |
| 2015/0351637 A1 * | 12/2015 | Ruppersberg | A61B 5/74 600/474 |
| 2017/0115169 A1 | 4/2017 | Busche | |

FOREIGN PATENT DOCUMENTS

| | | | |
|---|---|---|---|
| CN | 101707905 A | 5/2010 | |
| JP | H06-94533 A | 4/1994 | |
| JP | H07-143969 A | 6/1995 | |
| JP | H11-37854 A | 2/1999 | |
| JP | 3069695 U | 6/2000 | |
| JP | 2001-149325 A | 6/2001 | |
| JP | 2002-340681 A | 11/2002 | |
| JP | 2002-345761 A | 12/2002 | |
| JP | 2006-509576 A | 3/2006 | |
| JP | 2006-250883 A | 9/2006 | |
| JP | 2009-544020 A | 12/2009 | |

OTHER PUBLICATIONS

Notice of Reasons for Refusal dated Sep. 14, 2021 received in Japanese Patent Application No. JP 2019-172667 together with an English language translation.
CN 2nd Office Action dated Jul. 29, 2024 issued in CN 202010943948.6.
First Office Action dated Dec. 27, 2023 received in Chinese Patent Application No. CN 202010943948.6.

* cited by examiner

COVER STRUCTURE, DETECTION DEVICE, AND METHOD FOR MANUFACTURING DETECTION DEVICE

CROSS-REFERENCE TO RELATED APPLICATIONS

This application is based upon and claims the benefit of priority from prior Japanese Patent Application No. 2019-172167, filed Sep. 20, 2019, and Japanese Patent Application No. 2019-172667, filed Sep. 24, 2019, the entire contents of which are incorporated herein by reference.

FIELD

The present invention relates generally to a cover structure, a detection device, and a method for manufacturing the detection device.

BACKGROUND

Conventionally, as an eardrum thermometer, for example, a thermometer including a probe to be inserted into an ear canal of a human ear, and a sensor provided near a distal end of the probe so as to face an eardrum (e.g., Jpn. Pat. Appln. KOKAI Publication No. 2002-340681) is known. The sensor detects infrared light emitted from the vicinity of the eardrum.

SUMMARY

As an aspect of the present invention, a cover structure includes a cover that covers a sensor, and an adhesion part that is formed of a shrinkable material and adheres tightly, by shrinkage, to the cover and a supporting part that supports the sensor.

As an aspect of the present invention, a detection device includes the cover structure, the supporting part, and a biological sensor for detecting biological information of a living organism as the sensor.

As an aspect of the present invention, a method for manufacturing the detection device includes providing the sensor in the supporting part, covering the sensor with the cover, arranging the adhesion part so as to overlap the cover and supporting part in a state in which the sensor is covered with the cover, and causing the adhesion part arranged so as to overlap the cover and supporting part to shrink so as to adhere tightly to the cover and supporting part.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION

Embodiments of the present invention will be described with reference to the accompanying drawings.

Figure 1:
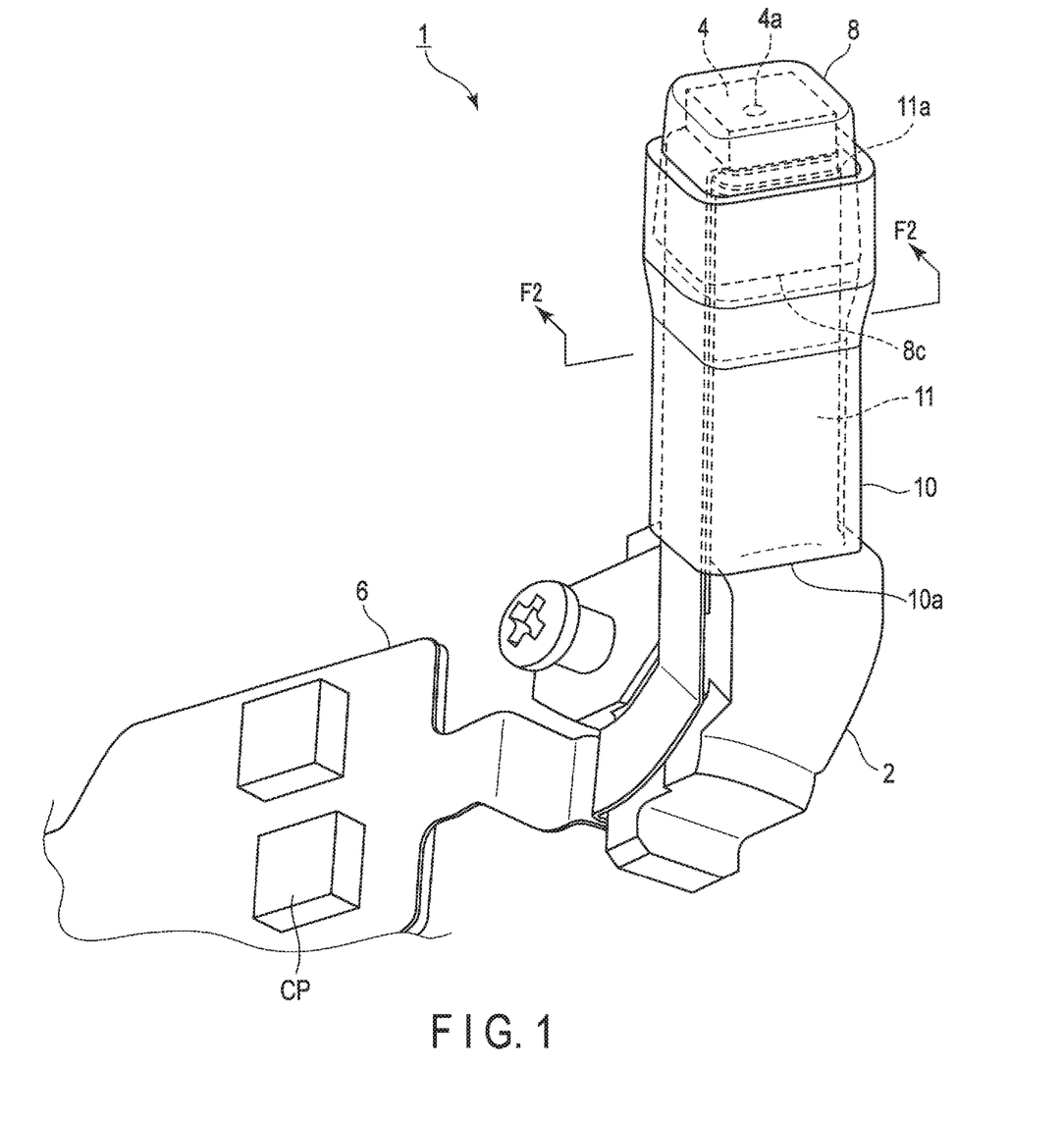
FIG. 1 is a perspective view showing a structure of a main component of a detection device according to a first embodiment of the present invention.
Figure 2:
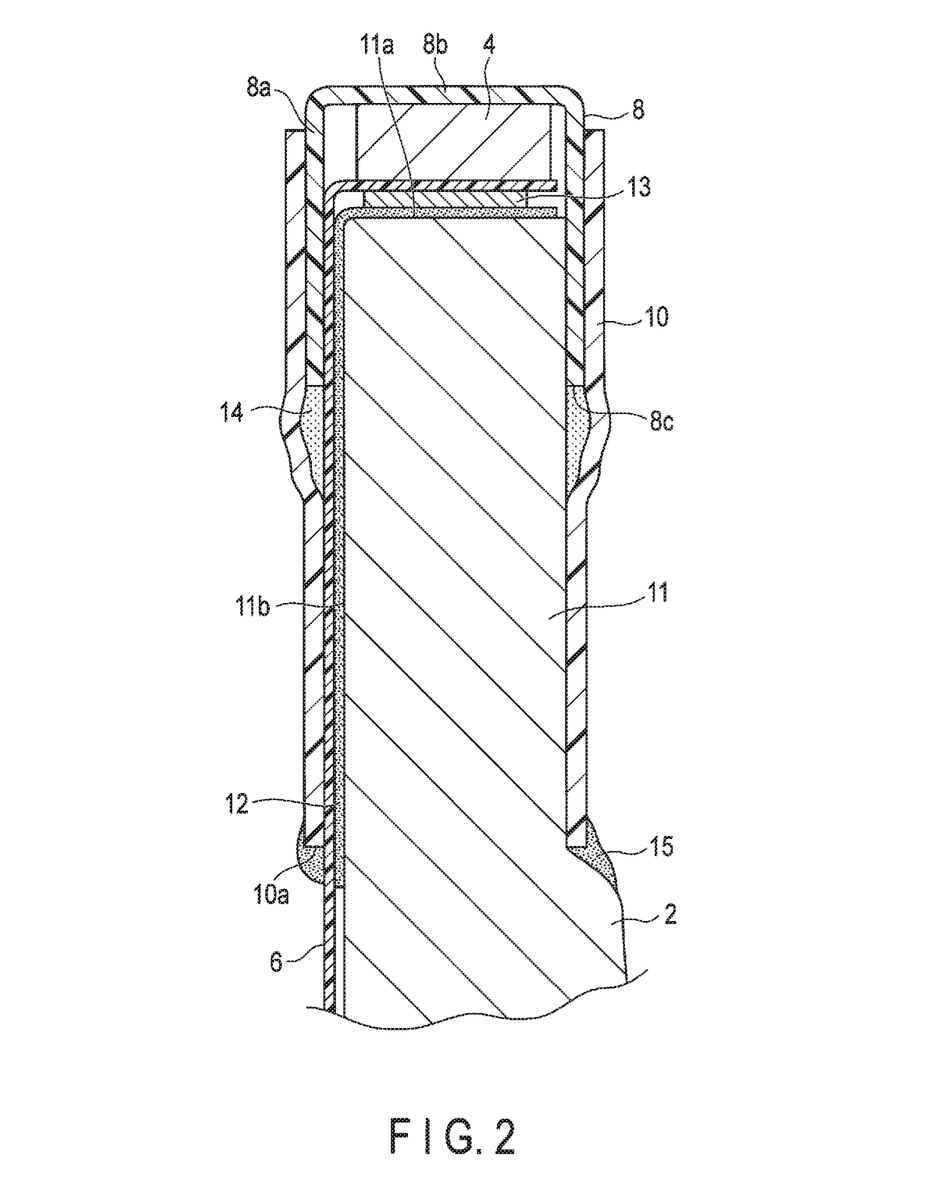
FIG. 2 is a cross-sectional view taken along a line F2-F2 of the structure in FIG. 1.

As shown in FIGS. 1 and 2, a detection device 1 according to a first embodiment of the present invention includes a supporting member 2 (supporting part), a temperature sensor 4 (sensor), a flexible printed circuit board 6 (hereinafter, referred to as "FPC 6"), a cover 8, and a heat shrinkable tube 10 (adhesion part). The detection device 1 includes a case (not shown) that accommodates the above structural elements 2, 4, 6, 8, and 10. Objects such as the case and heat shrinkable tube 10 are not provided on a side where the cover 8 faces a detection target (an eardrum of a human ear in the present embodiment) (not shown).

The supporting member 2 includes a columnar portion 11 formed of metal, resin, etc. The columnar portion 11 can be a columnar body having a D-shaped cross section, etc. other than a cylindrical or prismatic body. In the present embodiment, the columnar portion 11 is an approximately prismatic body having roundness at its four ridges. The shape of the columnar portion 11 can be selected discretionarily as long as it has a thickness and a shape such that insertion into an ear canal of a human ear is possible. The other portions of the supporting member 2 may have a shape that can be accommodated inside the case (not shown), which itself has a shape that conforms to the shape of an ear on which the detection device 1 is worn.

The temperature sensor 4 is mounted on a surface of the FPC 6. The FPC 6 is attached to a distal end 11a of the columnar portion 11 with a reinforcement plate 13 interposed therebetween. In other words, the temperature sensor 4 is attached to the distal end 11a of the columnar portion 11 with the FPC 6 and reinforcement plate 13 interposed therebetween. A printed wiring (a copper foil wiring pattern) (not shown) is provided on the surface of the FPC 6, and the temperature sensor 4 is electrically coupled to the printed wiring by solder.

The temperature sensor 4 is, for example, a thermopile or a bolometer, etc., and detects infrared light emitted from a detection target in a noncontact manner and converts the infrared light into a voltage. Specifically, the temperature sensor 4 includes a light-receiving surface 4a, and detects infrared light from the detection target by receiving the infrared light on this light-receiving surface 4a. The detection device 1 includes a controller CP electrically coupled to the FPC 6, and the controller CP measures (calculates) a temperature of the detection target based on the intensity of the infrared light detected through the temperature sensor 4 and displays a measurement result through a display (not shown). The controller CP includes, for example, an I/O interface, a central processing unit (CPU), a random access memory (RAM), and a read only memory (ROM), and calculation of the detection target temperature in this case is performed by correcting the intensity of the infrared light detected by the temperature sensor 4 based on an infrared attenuation rate stored in advance in the ROM, etc. This infrared attenuation rate is set by determining infrared light transmission attenuation by the cover 8 in a state in which the cover 8 is attached to the temperature sensor 4 in the manufacturing process of the detection device 1.

The FPC 6 with the temperature sensor 4 mounted is bent into an L shape, and is attached to the side surface 11b of the columnar portion 11 via an adhesive member 12. The adhesive member 12 may be divided into the portion of the side surface 11b and the portion of the distal end 11a of the columnar portion 11. The adhesive member 12 provided on the distal end 11a bonds the reinforcement plate 13 to the distal end 11a. The reinforcement plate 13 is provided at a position facing the temperature sensor 4. A rear surface of the FPC 6 and the reinforcement plate 13 are fixed by an adhesive agent (not shown), etc.

The cover 8 is formed of a material that can transmit infrared light. In the present embodiment, the cover 8 integrally includes a peripheral wall 8a having an approximately rectangular cylindrical shape that is one size larger than the columnar portion 11 of the supporting member 2, and a top wall 8b having an approximately rectangular plate shape and closing one end of the peripheral wall 8a in an axial direction. In the present embodiment, the cover 8 is formed of polyethylene, and the thickness of the top wall 8b is set at least within a range from 50 µm to 300 µm. As a material of the cover 8, polypropylene can also be used instead of polyethylene. Other than that, materials that are good transmitters of infrared light can be used, such as a single crystal of silicon or a crystal of germanium.

In the case of using polyethylene as the material of the cover 8, hot pressing can be performed at a lower temperature than in the case of using polypropylene and thus the processing of the cover 8 is easier. In addition, since polyethylene is a more common cover material than polypropylene, the cover 8 can be constituted at a lower cost if polyethylene is used as the material therefor instead of polypropylene. On the other hand, polypropylene has a higher softening temperature than that of polyethylene, and thus is useful as a material of the cover 8 when the temperature sensor 4 is used in a high temperature condition.

The distal end 11a of the columnar portion 11 of the supporting member 2 is covered with the cover 8 so as to cover the temperature sensor 4 in a direction in which the rear surface of the top wall 8b faces the light-receiving surface 4a of the temperature sensor 4. In the present embodiment, the cover 8 is attached to the distal end 11a of the columnar portion 11, where the rear surface of the top wall 8b of the cover 8 is brought into contact with (caused to adhere tightly to) the light-receiving surface 4a of the temperature sensor 4, but a space may be provided between the temperature sensor 4 (light-receiving surface 4a) and the top wall 8b of the cover 8. In this way, the light-receiving surface 4a and the cover 8 adhere tightly to each other so that regions of both 4a and 8 adhering to each other are isothermal. Regardless, the cover 8 covers the entire temperature sensor 4 and a part of the columnar portion 11 on the distal end 11a side and a part of the FPC 6. An annular seal member 14 made of resin having a thermosoftening property, etc., is provided between an annular edge 8c on the opposite side of the top wall 8b of the cover 8 and the side surface 11b of the columnar portion 11.

The heat shrinkable tube 10 is formed into a cylinder one size larger than the peripheral wall 8a of the cover 8 by a heat shrinkable material containing polyethylene. The length of the heat shrinkable tube 10 along the axial direction is approximately the same as that of the columnar portion 11. The heat shrinkable tube 10 is attached to cover the outer side of the peripheral wall 8a of the cover 8 so as to overlap at least the edge 8c (and the seal member 14) of the cover 8. In other words, the heat shrinkable tube 10 is arranged to overlap and adhere tightly to a portion (i.e., the peripheral wall 8a) of the cover 8 other than the top wall 8b of the cover 8 arranged between the temperature sensor 4 and a detection target. The heat shrinkable tube 10 adheres tightly to the side surface 11b (an outer peripheral surface) of the columnar portion 11, the peripheral wall 8a of the cover 8, the edge 8c of the cover 8, and the FPC 6, in a state in which the heat shrinkable tube 10 is shrunk after being heated.

Figure 3:
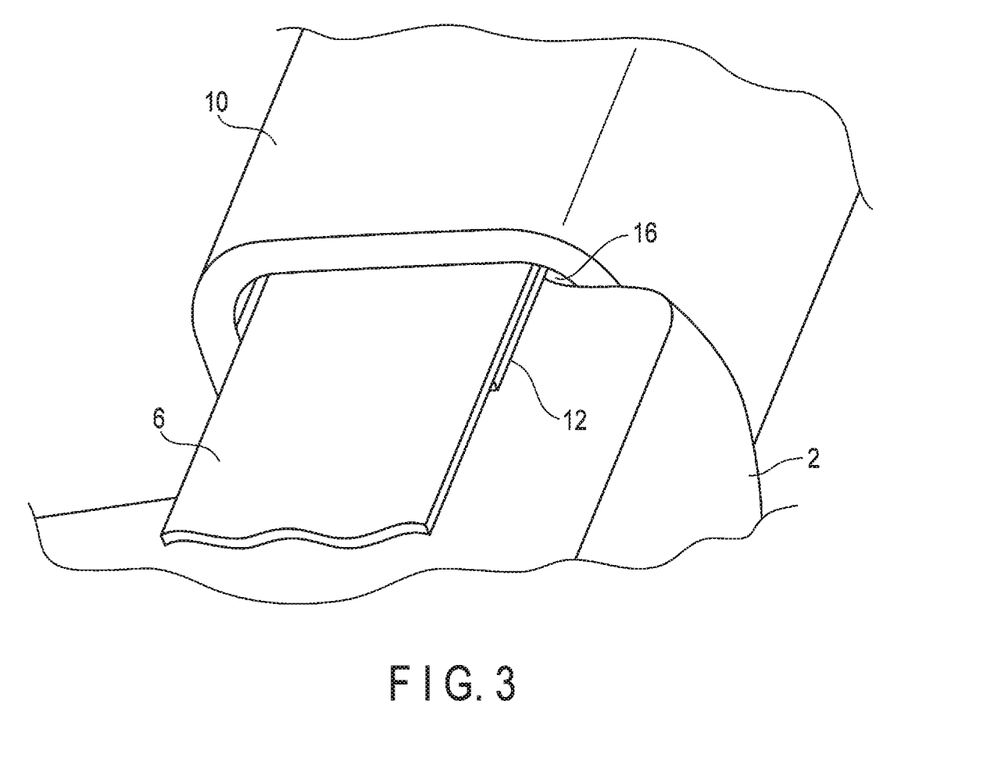
FIG. 3 is a partially enlarged perspective view showing a gap between a heat shrinkable tube and a supporting member of FIG. 1.

Near a lower end edge 10a of the heat shrinkable tube 10 which is separated from the cover 8, an annular seal member 15 (not shown in FIG. 1) is provided. This seal member 15 seals to prevent water from penetrating through a gap 16 between the FPC 6 attached to the side surface 11b of the columnar portion 11 and the side surface 11b of the columnar portion 11 as shown in FIG. 3. FIG. 3 shows a state prior to shrinkage of the heat shrinkable tube 10. The seal member 15 may be provided at least at a position to seal the above-described gap 16, and does not necessarily have to be provided in an annular shape. The seal member 15 is, for example, a resin having a thermosoftening property, etc.

Herein, a method for assembling the detection device 1 will be described with reference to FIGS. 4 and 5 together with FIG. 2.

When assembling the detection device 1 having the above-described structure, first, the FPC 6 mounting the temperature sensor 4 is attached to the distal end 11a and side surface 11b of the columnar portion 11 of the supporting member 2 via the adhesive member 12. At this time, the FPC 6 may only be temporarily attached to the columnar portion 11, and the adhesive member 12 may be, for example, a double-sided tape, etc. In addition, at this time, the reinforcement plate 13 is attached between the FPC 6 and the distal end 11a of the columnar portion 11.

After that, the temperature sensor 4 is covered with the cover 8, and the seal member 14 is provided between the edge 8c of the cover 8 and the side surface 11b of the columnar portion 11. Furthermore, the heat shrinkable tube 10 is arranged to overlap the outer side of the peripheral wall 8a of the cover 8 so that at least the heat shrinkable tube 10 overlaps the outer side of the edge 8c (and the seal member 14) of the cover 8. Then, the seal member 15 is provided annularly along the lower end edge 10a (FIG. 2) of the heat shrinkable tube 10. This state is shown in FIG. 4.

Figure 4:
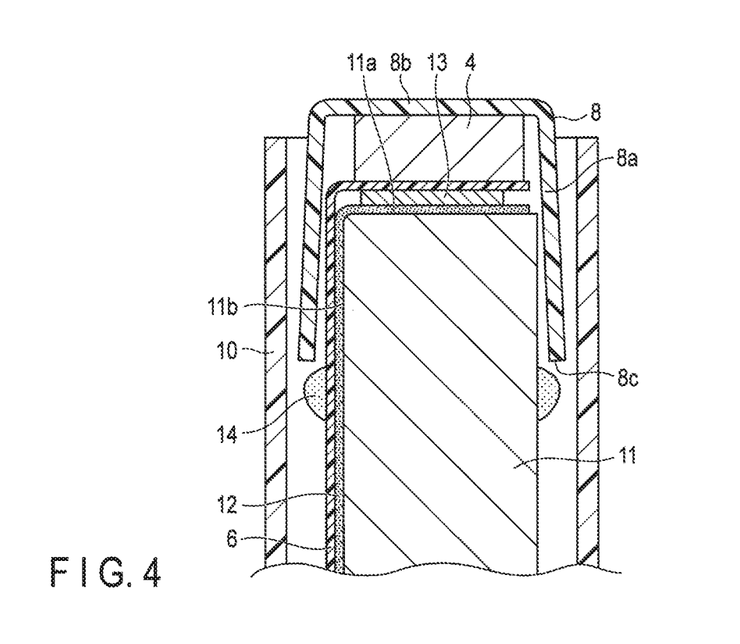
FIG. 4 is a cross-sectional view for explaining a method for manufacturing the detection device together with FIG. 2.
Figure 5:
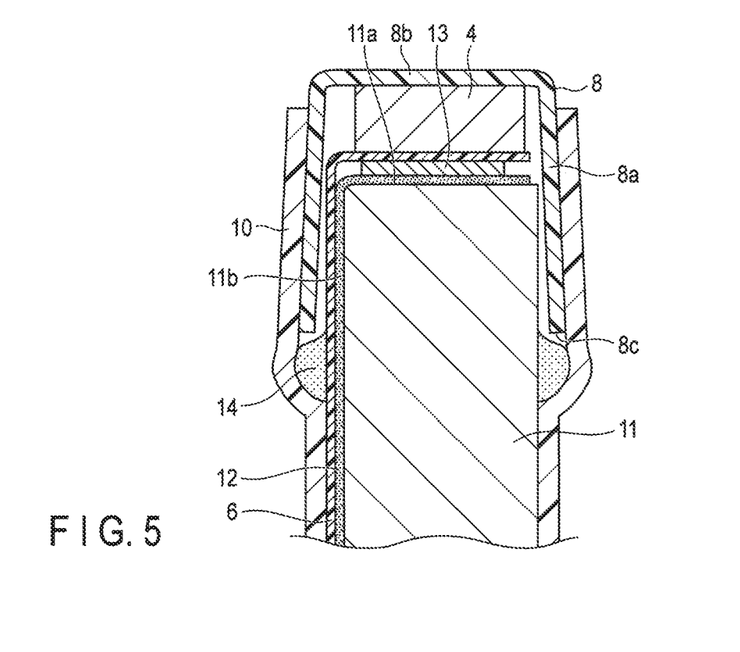
FIG. 5 is a cross-sectional view for explaining the method for manufacturing the detection device together with FIG. 2.

From the state of FIG. 4, the heat shrinkable tube 10 is softened at the same time as being heated to shrink so that the heat shrinkable tube 10 is caused to adhere tightly to the side surface 11b of the columnar portion 11 of the supporting member 2, FPC 6, peripheral wall 8a and edge 8c of the cover 8, and seal member 14. This state is shown in FIG. 5.

Furthermore, by the cover 8 being heated and softened by heating of the heat shrinkable tube 10 and further shrinkage of the heat shrinkable tube 10, the cover 8 (peripheral wall 8a and edge 8c) is caused to adhere tightly to the side surface 11b of the columnar portion 11 and FPC 6, and also the adhesiveness at an interface between the cover 8 and heat shrinkable tube 10 is improved. This state is shown in FIG. 2. In the present embodiment, since the cover 8 and heat shrinkable tube 10 are formed of materials containing polyethylene and thus have good affinity between the materials, this causes the cover 8 and heat shrinkable tube 10 to adhere tightly to each other well.

In addition, when the heat shrinkable tube 10 is heated, the seal members 14 and 15 having a thermosoftening property are also softened, a space between the edge 8c of the cover 8 and the side surface 11b of the columnar portion 11 is sealed, and a space between the lower end edge 10a of the heat shrinkable tube 10 and the side surface 11b of the columnar portion 11 is sealed so that the gap 16 with the FPC 6 is filled.

Thereby, the temperature sensor 4 can be reliably protected, the printed wiring and solder of the FPC 6 can be prevented from rusting due to water, etc., and a problem, such as breaking or short circuit of the wiring, can be prevented.

In reality, the seal member 15 is a portion located outside the ear canal and thus has an extremely low risk for water penetration. Thus, the seal member 15 is not an essential configuration for the present invention. Similarly, the seal member 14 is also not an essential configuration for the present invention. In addition, since the FPC 6 is firmly pressed (is tight) against the side surface 11b of the columnar portion 11 by the shrinkage of the heat shrinkable tube 10, the FPC 6 may only be temporarily attached to the columnar portion 11 by the adhesive member 12, and the adhesive member 12 can be omitted depending on circumstances.

Other than that, in order to keep the printed wiring and solder waterproof, it is conceivable to apply an adhesive agent, etc. on the surface of the FPC 6. However, due to the difficulty in managing the outer shape of the temperature sensor 4, there is a possibility that the adhesive agent may be attached to the light receiver (light-receiving surface 4a) of the temperature sensor 4, making it difficult to maintain a consistent level of quality. In addition, it is difficult to stabilize the coating thickness and position of the adhesive agent, which makes it difficult to ensure waterproof reliability. Thus, it is not realistic to adopt a waterproofing method of directly applying the adhesive agent on the surface of the FPC 6.

Incidentally, the detection device 1 of the present embodiment is an eardrum thermometer for measuring a temperature of a human body by inserting the columnar portion 11 into an ear canal of the human ear. In this case, biological information is the temperature of the human body, and a detection target is an eardrum located at an inner part of the ear canal and skin therearound. The temperature sensor 4 detects far infrared light at a wavelength of about 10 μm emitted from the eardrum and therearound, in a non-contact manner. In a case where a temperature of the detection target is the temperature of the human body, a wavelength of infrared light to be detected will be about 10 μm.

Thus, the cover 8 that covers the temperature sensor 4 needs to be capable of transmitting far infrared light having a wavelength of about 10 μm well. In the present embodiment, the cover 8 is formed of polyethylene that can transmit infrared light, and in order to sufficiently increase transmittance of infrared light and maintain sufficient mechanical strength of the cover 8, the thickness of the top wall 8b of the cover 8 is set at least within a range from 50 μm to 300 μm. The thickness of the top wall 8b of the cover 8 is desirably 50 μm or more to give the cover 8 itself certain mechanical strength, and is desirably 300 μm or less to ensure a sufficient transmission amount of infrared light required for temperature detection.

By providing the above-described cover 8, it is possible to protect the temperature sensor 4 reliably, and also enable infrared light detection by the temperature sensor 4. In addition, according to the present embodiment, the waterproof reliability of the temperature sensor 4 can be increased, and thus the temperature sensor 4 can be located near the eardrum by attaching the temperature sensor 4 to the distal end 11a of the columnar portion 11, thereby increasing detection sensitivity of the temperature sensor 4.

However, it is not easy to manufacture the cover 8 with the top wall 8b having the above-described thickness by polyethylene. For example, in a case of manufacturing the cover 8 by injection molding, a limit of the thickness of the cover 8 is about 500 μm, and the cover 8 cannot be made thinner than this limit. Thus, in the present embodiment, the cover 8 having the above-described thickness is manufactured by hot pressing, such as vacuum molding or air pressure forming, which applies heat to a thin sheet-like polyethylene and draws it.

Herein, an example of a method for manufacturing the cover 8 will be briefly described with reference to FIGS. 6A to 6C.

Figure 6A:
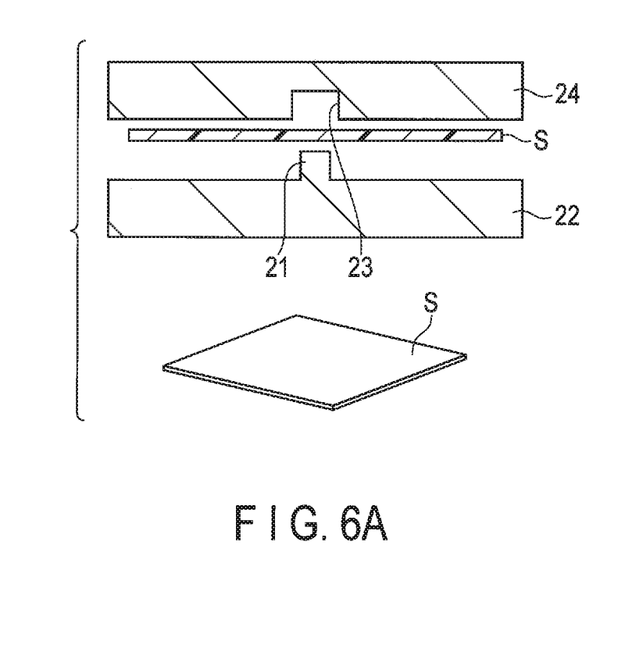
FIG. 6A is a diagram for explaining an example of a method for manufacturing a cover of FIG. 1.
Figure 6B:
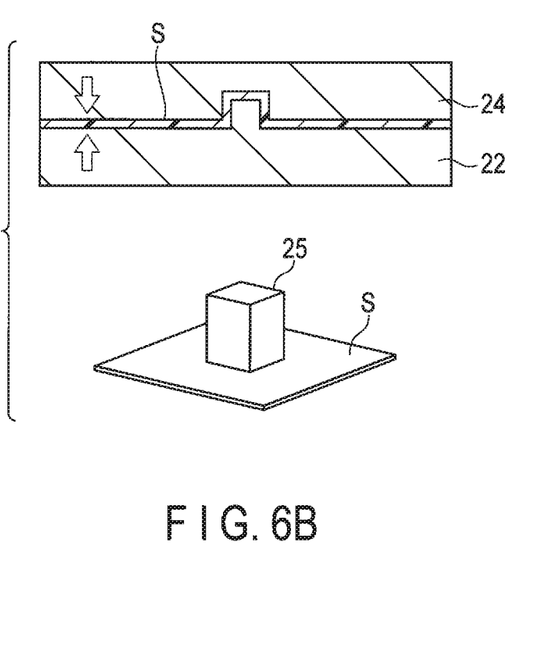
FIG. 6B is a diagram for explaining the example of the method for manufacturing the cover of FIG. 1.

In a case of manufacturing the cover 8, first, as shown in FIG. 6A, a polyethylene sheet S having a thickness of about 0.2 mm is arranged between a positive die 22 having a rectangular columnar convex portion 21 and a female die 24 having a rectangular concave portion 23 having a horizontal cross section larger than the convex portion 21. Next, in that state, as shown in FIG. 6B, the polyethylene sheet S is held between the positive die 22 and female die 24, and is pressed by hot pressing. Thereby, a bottomed cylindrical part 25 having the same outer shape as that of the concave portion 23 of the female die 24 is formed in the polyethylene sheet S.

Figure 6C:
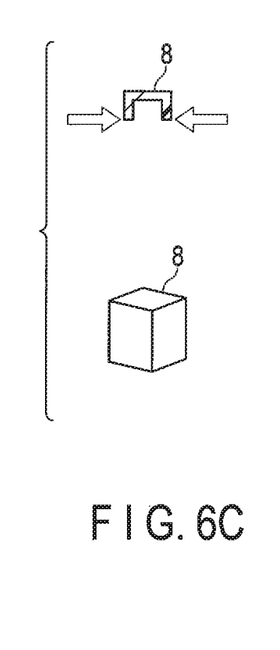
FIG. 6C is a diagram for explaining the example of the method for manufacturing the cover of FIG. 1.

Then, as shown in FIG. 6C, side surfaces of the cylindrical part 25 are cut from arrow directions shown in the figure so as to obtain the cover 8. In this case, if a portion of the polyethylene sheet S continuous to the edge of the cylindrical part 25 is cut, a flange (not shown) is formed at the edge of the cover 8, and when the heat shrinkable tube 10 is put on, the heat shrinkable tube 10 cannot be caused to adhere tightly to the cover 8 appropriately. Thus, in the present embodiment, the side surfaces of the cylindrical part 25 are cut in order to increase adhesiveness with the heat shrinkable tube 10.

As described above, according to the present embodiment, the cover 8 is formed by hot pressing of the polyethylene sheet S so that the cover 8 having a desired thickness can be obtained.

From the viewpoint of waterproofing, it is desirable to make the cover 8 long enough in its axial direction so as to cover an approximately entire length of the columnar portion 11 by the cover 8. However, in the above-described hot pressing, the cylindrical peripheral wall 8a of the cover 8 can only have a length up to about a length of one side of the top wall 8b. Thus, in the present embodiment, in addition to the cover 8 having a waterproof function and an infrared light transmission function, the heat shrinkable tube 10 is used to make up for the length of the cover 8.

Since the thickness of the top wall 8b of the cover 8 is related to a transmission amount of infrared light, it is desirable to form the top wall 8b in a constant thickness without any variation. However, in the above-described method of drawing the polyethylene sheet S by hot pressing, there is a possibility that a slight variation may be generated in the thickness of the top wall 8b. The variation occurring in the thickness of the top wall 8b will cause a variation in the infrared light detection sensitivity of the temperature sensor 4.

Figure 7:
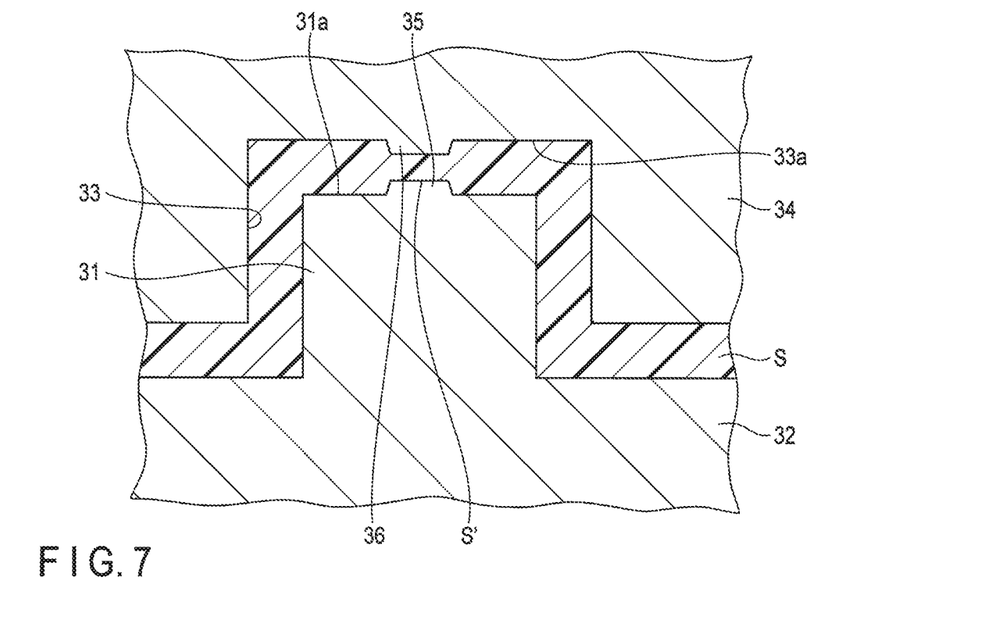
FIG. 7 is a diagram for explaining a modification of forming a thin-walled portion in the cover of FIG. 1.

Thus, as shown by a modification shown in FIG. 7, a method of providing a die for drawing the polyethylene sheet S with projections 35 and 36 for making the thickness of the top wall 8b partially thin is conceivable. The projections 35 and 36 are provided at a position facing the light-receiving surface 4a of the temperature sensor 4. That is, the projection 35 is provided in a top 31a of the convex portion 31 of the positive die 32, and the projection 36 is provided in a bottom 33a of the concave portion 33 of the female die 34 facing this projection 35 so that the wall thickness of the polyethylene sheet S between these two projections 35 and 36 may be made thinner than the wall thickness of the other portions.

Thereby, it is possible to control the thickness of the sheet at a portion S' with a thinned wall thickness to a desired thickness, and make the detection sensitivity of the temperature sensor 4 constant. In addition, in this way, by providing the thin-walled portion S' in the cover 8, it is possible to increase the infrared light transmission amount at this portion, and increase the infrared light detection sensitivity of the temperature sensor 4 accordingly.

Figure 8:
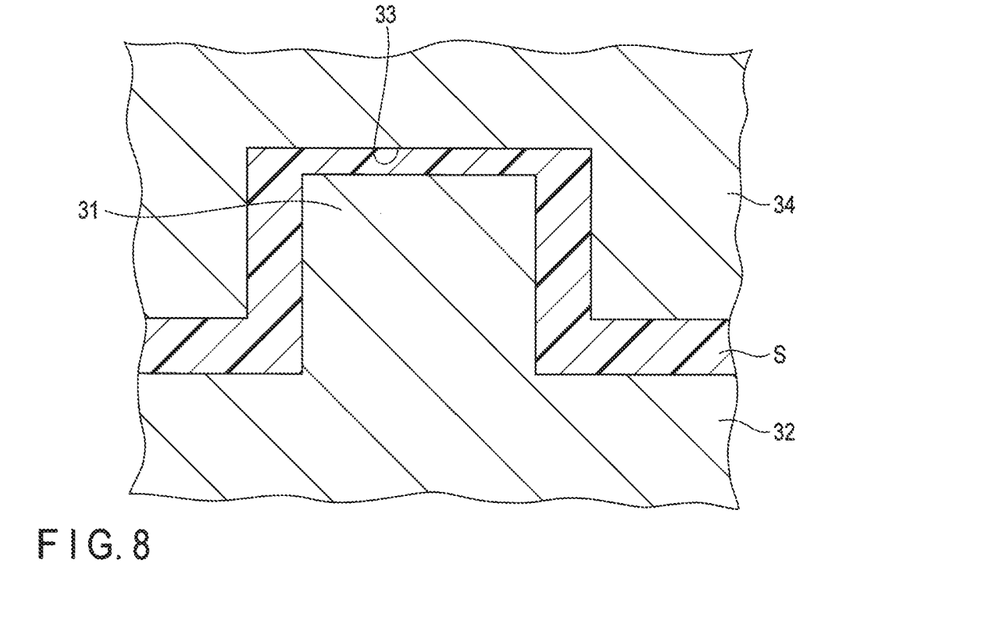
FIG. 8 is a diagram for explaining another modification of the cover of FIG. 1.

It is also effective to make the entire top wall 8b thinner than the peripheral wall 8a like another modification shown in FIG. 8, rather than making a part of the top wall 8b of the cover 8 thin as in the above-described modification. The cover 8 in which the thickness of the top wall 8b is made thinner than that of the peripheral wall 8a in this way can be manufactured by adjusting a height of the convex portion 31 of the positive die 32 and a depth of the concave portion 33 of the female die 34. That is, according to this modification, the thickness of the peripheral wall 8a can be made thicker than 300 μm, while the thickness of the top wall 8b of the cover 8 is made from 50 μm to 300 μm that allows infrared light to easily pass through. In this case, as well as transmitting infrared light well, it is possible to increase mechanical rigidity of the cover 8 to a desired degree, and increase attaching strength of the cover 8 to the columnar portion 11 of the supporting member 2.

As described above, according to the detection device 1 according to the present embodiment, the cover 8 formed by drawing of the thin polyethylene sheet by hot pressing is attached so as to cover the temperature sensor 4 provided in the supporting member 2 so that infrared light emitted from the vicinity of the eardrum can be transmitted and detected by the temperature sensor 4 and the temperature sensor 4 can be protected reliably. Thus, according to the present embodiment, it is possible to prevent earwax and water from being attached to the light-receiving surface 4a of the temperature sensor 4, and prevent the problem that the printed wiring and solder of the FPC 6 mounting the temperature sensor 4 become rusty.

In addition, according to the present embodiment, the temperature sensor 4 is attached to the distal end 11a of the columnar portion 11 of the supporting member 2 so that the temperature sensor 4 can be located closer to the eardrum and skin therearound that are detection targets, thereby increasing the detection sensitivity of the temperature sensor 4. Furthermore, according to the present embodiment, since it is possible to ensure the waterproofing of the temperature sensor 4, the detection device 1 can be worn on an ear and used continuously for a long time, and a temperature of a human body can be measured continuously and accurately.

In addition, according to the present embodiment, the cover 8 made of polyethylene (or polypropylene) is known to be a poorly adhesive material member, but the cover 8 can be fixed to the supporting member 2 appropriately by tight adhesion of the heat shrinkable tube 10 to the cover 8 and supporting member 2.

Further, according to the present embodiment, since the heat shrinkable tube 10 is caused to shrink to adhere tightly to the cover 8 and supporting member 2, it is possible to reduce the dimension of a horizontal cross section of the probe including the columnar portion 11, FPC 6, cover 8, and heat shrinkable tube 10, which are inserted into an ear canal. Thereby, it is possible to facilitate the insertion of the probe into the ear canal, insert the temperature sensor 4 deeply into the ear canal reliably, and increase detection accuracy.

Furthermore, according to the present embodiment, the cover 8 (top wall 8b) adheres tightly to the light-receiving surface 4a of the temperature sensor 4 so that regions of both 8 and 4a adhering tightly to each other are isothermal. Accordingly, since infrared radiation does not occur between the temperature sensor 4 and cover 8, a fluctuation of an infrared light energy amount does not occur when in use. Thus, differing from the case of the sensor disclosed in Japanese Patent Appln. KOKAI Publication No. H6-94533, real-time correction while detecting the temperature of the cover 8 is unnecessary. Accordingly, a sensor for temperature detection of the cover 8 is unnecessary, which can contribute to miniaturization and power-saving. In addition, a correction algorithm is simplified also in the controller CP, which enables memory reduction, processing speed improvement, and development period reduction. Therefore, the cost of the entire detection device 1 can be reduced.

The present invention has been explained based on the first embodiment; however, the present invention is not limited to the above-described first embodiment. The present invention may, of course, be modified and applied in various ways without departing from the spirit and scope of the invention.

For example, in the above-described first embodiment, the case where the present invention is applied to the detection device 1 that is worn on a human ear to measure a body temperature has been explained, but the present invention is not limited thereto. The present invention is also applicable to a device that detects biological information (e.g., a pulse wave, etc.) other than a body temperature by inserting a probe inside a human body, a device that detects biological information of a living organism other than humans, etc. In addition, other than these devices, the present invention is also applicable to a cover structure that protects a sensor portion of a human sensor of an air conditioner and a human sensor of bathroom lighting, a thermometer that detects a water temperature and an oil temperature and is installed in an IR cooking device, etc., a sensor part of an ultraviolet light sensor used when jogging, sea bathing, etc. outdoors, a sensor part of a deep temperature sensor of soil, an illuminance meter using visible light, a sensor part of a sensor that detects ultraviolet light radiated from a flame of a fire, etc., and a cover structure that protects any other object.

Further, in the above-described first embodiment, the case of manufacturing the cover 8 by processing a polyethylene sheet has been explained, but the present invention is not limited thereto. For example, the cover 8 may be formed of polypropylene that can transmit infrared light. In a case where biological information to be detected is not a body temperature, a material that enables detection of the biological information at a detection part may be selected as appropriate to form a cover having a predetermined thickness. In any case, for protecting the detection part, the heat shrinkable tube 10 may be caused to adhere tightly to the supporting member 2 and cover 8 so as to cause the edge 8c of the cover 8 to adhere tightly to the side surface 11b of the columnar portion 11.

In addition, in the above-described first embodiment, the case where the cover 8 is formed of a relatively thin polyethylene sheet, and the cover 8 is deformed along with the shrinkage of the heat shrinkable tube 10 to cause the cover 8 to adhere tightly to the side surface 11b of the columnar portion 11 has been explained, but the present invention is not limited thereto. The cover 8 may be formed of a rigid body that can transmit infrared light so as to cover the space between the cover 8 and the columnar portion 11 by the heat shrinkable tube 10. That is, regardless of the material and hardness of the cover 8, the heat shrinkable tube 10 shrunk by heat may be caused to adhere tightly to both the cover 8 and columnar portion 11 so as to air-tightly seal an internal space of the cover 8.

In addition, in the above-described first embodiment, the case where the heat shrinkable tube 10 that adheres tightly to the cover 8 and columnar portion 11 is formed in an approximately cylindrical shape has been explained, but the present invention is not limited thereto. A heat shrinkable member having a C or U-shaped horizontal cross section may also be used. In the above-described first embodiment, the case where an object to which the heat shrinkable tube 10 adheres tightly is the cover 8 and columnar portion 11 has been explained. However, since the FPC 6 is also included in a "supporting part" in the claims, keeping the cover 8 airtight by causing the heat shrinkable tube 10 to adhere tightly to the FPC 6 is included in the scope of the present invention.

Further, instead of the heat shrinkable tube 10, a normal temperature shrinkable tube that shrinks at a normal temperature without the need for heating may be used. The normal temperature shrinkable tube contains a core material that suppresses shrinkage of the tube from an inner side and a tube-like shrinkable material formed of an elastic member. The normal temperature shrinkable tube is formed by arranging the shrinkable material outside the core material in a state in which the shrinkable material is extended from the inner side to the outer side in the radial direction. At the time of construction, the columnar portion 11 and cover 8 that are covering targets are arranged in an inner portion of the core material, and the core material is removed to allow the shrinkable material to shrink. Thereby, the shrinkable material is attached so as to connect over the columnar portion 11 and cover 8.

Figure 9:
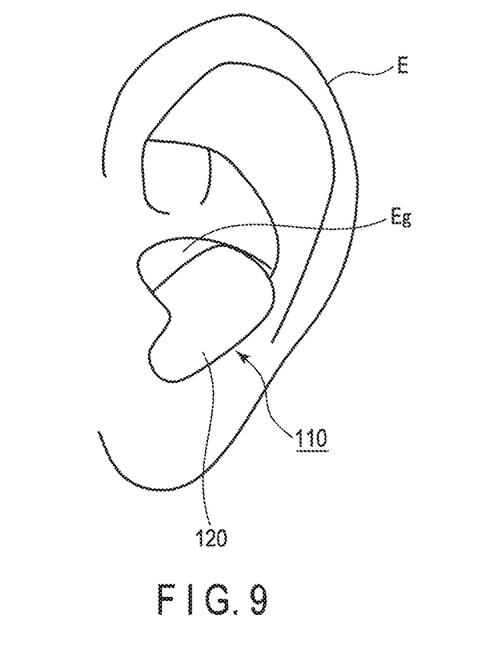
FIG. 9 is a perspective view showing a state in which a detection device according to a second embodiment of the present invention is worn on an ear of a subject.
Figure 10:
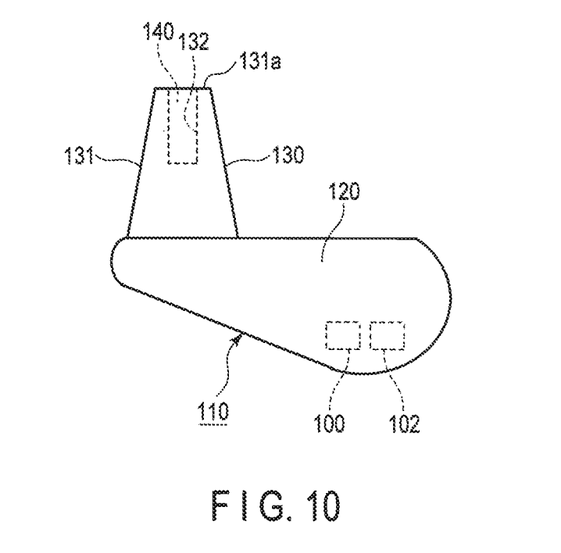
FIG. 10 is a side view showing the detection device of FIG. 9.
Figure 11:
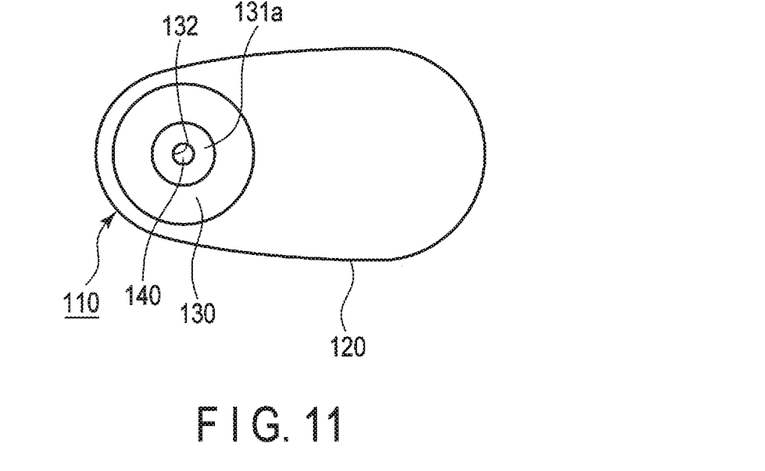
FIG. 11 is a front view showing the detection device of FIG. 10.
Figure 12:
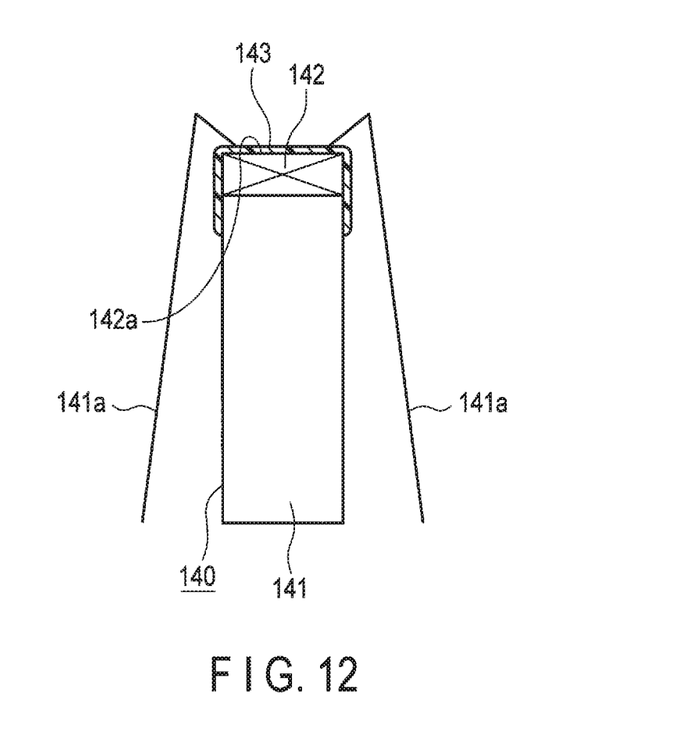
FIG. 12 is a cross-sectional view showing a temperature sensor incorporated into the detection device of FIG. 10.
Figure 13:
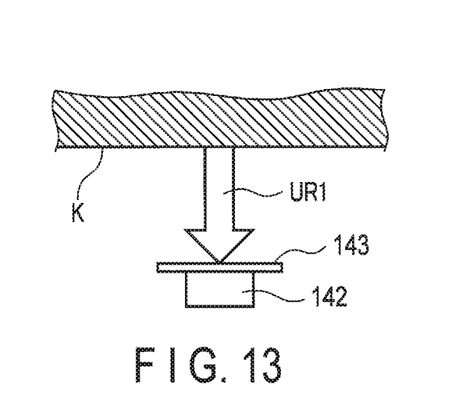
FIG. 13 is an explanatory drawing for explaining a relationship among an eardrum, a sensor cover, and an infrared temperature sensor in the detection device of FIG. 10.
Figure 14:
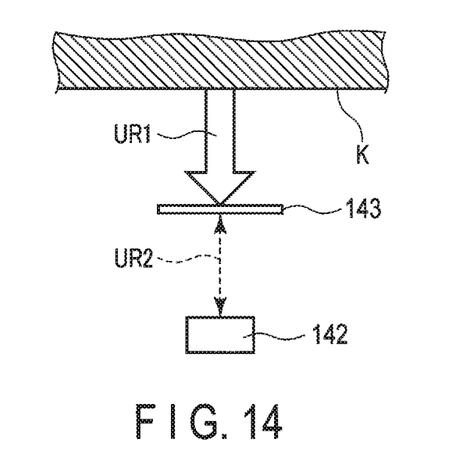
FIG. 14 is an explanatory drawing for explaining a relationship among the eardrum, sensor cover, and infrared temperature sensor in the detection device of FIG. 10.

Next, a detection device 110 according to a second embodiment of the present invention will be described with reference to FIGS. 9 to 14. FIG. 9 is a perspective view showing a state in which the detection device 110 is worn on an ear E of a subject, FIG. 10 is a side view showing the detection device 110, FIG. 11 is a front view showing the detection device 110, FIG. 12 is a cross-sectional view showing a sensor device 140 incorporated into the detection device 110, and FIGS. 13 and 14 are explanatory drawings for explaining a relationship among an eardrum K, a sensor cover 143, and an infrared temperature sensor 142 in the detection device 110. Note that UR1 and UR2 in FIGS. 13 and 14 indicate infrared lights.

The detection device 110 includes a device main body 120, an insertion body 130 formed to be projected from this device main body 120 and to be inserted toward an ear canal of the ear E, and a sensor device 140 attached to a distal end of this insertion body 130.

The device main body 120 is formed to be sufficiently larger than an ear canal, and has a shape to be worn by locking to a tragus and a cavum conchae by a positional relationship with the insertion body 130 inserted into the ear canal. In addition, in an internal portion of the device main body 120, a controller 100, and a battery (power source) 102 that supplies electric power to the controller 100 and sensor device 140, are accommodated.

The insertion body 130 includes an ear chip 131 formed in an approximately truncated cone shape in which a distal end side is thinner than a proximal end side so as to be easily inserted into the ear canal and pointed to the eardrum K, and an insertion hole 132 provided in a light-receiving part 131a at a distal end of this ear chip 131 and into which the sensor device 140 is inserted. The ear chip 131 is formed of a soft material (silicon rubber, etc.) that is highly safe when in contact with a human body.

The sensor device 140 includes a cylindrical housing 141. A pair of leaf springs 141a are attached to the housing 141. The leaf springs 141a expand by their elastic force when the leaf springs 141a are inserted into the insertion hole 132. Thereby, the housing 141 is fixed to an inner portion of the insertion hole 132.

The infrared temperature sensor 142 is attached to a distal end of the housing 141 in such a manner that its light-receiving surface 142a faces up in FIG. 12. A sensor cover 143 made of a polyethylene material is attached to a front surface of the infrared temperature sensor 142. A thickness of the sensor cover 143 is 50 µm to 300 µm. The thickness of less than 50 µm leads to insufficient strength, and the thickness of over 300 µm leads to a large infrared attenuation amount and decrease in measurement accuracy. The thickness of the sensor cover 143 is set accurately, and an infrared attenuation rate is calculated by a known calculation equation. The calculated infrared attenuation rate is stored in the controller 100.

The sensor cover 143 covers the entire light-receiving surface 142a of the infrared temperature sensor 142, and a periphery thereof is adhered to an outer peripheral surface of the housing 141 by a heat conductive adhesive agent, or fixed thereto by pressing a side surface of the sensor cover 143 by a heat shrinkable tube, etc., as described in the first embodiment. An output terminal of the infrared temperature sensor 142 is coupled to the controller 100 accommodated in the device main body 120 by using a flexible substrate, a lead wire, etc.

The light-receiving surface 142a of the infrared temperature sensor 142 and the sensor cover 143 adhere tightly to each other so as not to form a gap, and their respective adhered regions are isothermal.

The detection device 110 configured as such is used in the following manner. That is, when the detection device 110 is powered on, electric power is supplied to the controller 100 from the battery 102. The infrared temperature sensor 142 coupled to the controller 100 is activated, and measures an infrared light intensity that is input to the infrared temperature sensor 142. The measured infrared light intensity is output as a detection signal, and input to the controller 100. The detection signal is input to a processor after being amplified, A/D converted, etc., in the controller 100. Herein, correction is performed based on an infrared attenuation rate stored in advance, and a temperature signal is output.

At this time, after the infrared light UR1 enters the detection device 110 as shown in FIG. 13, the infrared light radiation UR2 shown in FIG. 14 does not occur between the infrared temperature sensor 142 and sensor cover 143, and thus a fluctuation of an infrared light energy amount does not occur when in use. Thus, real-time correction while detecting a temperature of the sensor cover 143 is unnecessary. Accordingly, after the correction based on the infrared attenuation rate is performed by the processor, the signal is output as the temperature signal. The temperature signal is stored in a memory in the controller 100, and then displayed and transmitted to the outside.

According to the detection device 110 with the above-described configuration, if transmission attenuation correction setting is performed in an early stage (at the time of manufacturing, etc.) in a state in which the sensor cover 143 is attached, real-time correction while detecting the temperature of the sensor cover 143 is unnecessary. Accordingly, a sensor for detecting the temperature of the sensor cover 143 is unnecessary, which can contribute to miniaturization and power-saving. In addition, a correction algorithm is simplified in the controller 100, which enables memory reduction, processing speed improvement, and development period reduction. Therefore, the cost of the entire detection device 110 can be reduced.

Note that the sensor cover 143 can be made of polyethylene that is cheap and easy to mold, and can maintain waterproof and antifouling functions of the infrared temperature sensor 142. Even with the sensor cover 143 mounted, the device can maintain sufficient measurement performance as a thermometer.

The present invention is not limited to the above-described second embodiment. For example, a polyethylene material is exemplified for the sensor cover in the above-described example, but another resin or glass material may be used as long as it has infrared transparency and the transmittance thereof is specified. Other than the above, various modifications may be carried out without departing from the spirit of the present invention. Further, the variations described above for the first embodiment naturally also apply to the second embodiment.

The invention of the present application is not limited to the embodiment described above, and can be modified variously modified in the implementation stage without departing from the scope of the invention. In addition, the embodiments may be suitably implemented in combination, in which case a combined effect is obtained. Furthermore, inventions in various stages are included in the above-described embodiments, and various inventions can be extracted by a combination selected from a plurality of the disclosed configuration requirements. For example, even if some configuration requirements are removed from all of the configuration requirements shown in the embodiments, if the problem described in the column of the background of the invention can be solved, and an effect is obtained, a configuration from which this configuration requirement is removed can be extracted as an invention.

The invention claimed is:

1. A cover structure comprising:
   a cover that covers a sensor; and
   an adhesion part that is formed of a shrinkable material over the cover and a supporting part that supports the sensor,
   wherein:
   an interior surface of the adhesion part is brought in contact with the cover and the supporting part by shrinkage of the adhesion part; and
   the cover is deformed by the shrinkable material of the adhesion part to cause an interior surface of the cover to adhere to the supporting part.

2. The cover structure according to claim 1,
   wherein the cover covers the sensor and a portion of the supporting part on the sensor side.

3. A detection device comprising:
   the cover structure according to claim 1;
   the supporting part; and
   the sensor, wherein the sensor comprises a biological sensor configured to detect biological information of a living organism.

4. The detection device according to claim 3,
   wherein the biological sensor is configured to detect a body temperature of the living organism as the biological information of the living organism, and
   wherein the biological sensor and the supporting part are inserted into an ear canal of the living organism during the detection of the body temperature of the living organism.

5. The detection device according to claim 3,
   wherein the biological sensor is a temperature sensor configured to detect infrared light emitted from a detection target of the living organism as the biological information of the living organism, and
   wherein the cover is formed of a material that transmits the infrared light.

6. The detection device according to claim 5,
   wherein the cover and the temperature sensor are caused to adhere, by shrinkage, to each other so that respective adhered regions thereof are isothermal.

7. The detection device according to claim 5,
   wherein the detection target is an eardrum and skin therearound of the living organism.

8. The detection device according to claim 5,
   wherein the cover is formed of a material containing polyethylene or polypropylene and to have a thickness of 50 μm to 300 μm, and
   wherein the adhesion part is formed of a material containing polyethylene or polypropylene.

9. The detection device according to claim 5,
   wherein the supporting part includes a columnar portion, to a distal end of which the temperature sensor is attached,
   wherein the cover covers the temperature sensor and the distal end of the columnar portion, and
   wherein the adhesion part is formed in a cylindrical shape surrounding an edge of the cover from an outer side and arranged along an outer peripheral surface of the columnar portion.

10. The detection device according to claim 9, wherein the cover includes at least a part of a portion covering the temperature sensor that is thinner than a portion arranged along the outer peripheral surface of the columnar portion.

11. The detection device according to claim 9, wherein the adhesion part adheres, by shrinkage, to a portion of the cover other than a portion of the cover positioned between the temperature sensor and the detection target.

12. The detection device according to claim 3, wherein the biological sensor includes a detection surface, and is attached to a distal end of the supporting part so as to expose the detection surface.

13. The detection device according to claim 12,
wherein the cover is configured to cover the biological sensor from a side of the detection surface in such a manner that an edge of the cover is positioned on a side surface of the supporting part on a side of the distal end, and
wherein the adhesion part is formed in a shape of a tube, and is configured to press the edge against the supporting part.

\* \* \* \* \*